United States Patent
Ishitoya et al.

(10) Patent No.: US 10,024,283 B2
(45) Date of Patent: Jul. 17, 2018

(54) SUCTION FILTER

(71) Applicants: KYOSAN DENKI CO., LTD., Koga, Ibaraki-pref. (JP); DENSO CORPORATION, Kariya, Aichi-pref. (JP)

(72) Inventors: Akihiro Ishitoya, Saitama (JP); Ryosuke Takahashi, Kariya (JP); Katsuhisa Yamada, Okazaki (JP)

(73) Assignees: KYOSAN DENKI CO., LTD., Koga (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 14/339,554

(22) Filed: Jul. 24, 2014

(65) Prior Publication Data

US 2015/0060349 A1 Mar. 5, 2015

(30) Foreign Application Priority Data

Sep. 3, 2013 (JP) ................... 2013-182451

(51) Int. Cl.
*F02M 37/22* (2006.01)
*B01D 35/027* (2006.01)
*B01D 35/26* (2006.01)
*B01D 35/00* (2006.01)

(52) U.S. Cl.
CPC .......... *F02M 37/22* (2013.01); *B01D 35/005* (2013.01); *B01D 35/0273* (2013.01); *B01D 35/26* (2013.01)

(58) Field of Classification Search
None
See application file for complete search history.

(56) References Cited

U.S. PATENT DOCUMENTS

| | | | | |
|---|---|---|---|---|
| 2,261,915 A | * | 11/1941 | Korte et al. | 417/423.3 |
| 2,367,055 A | * | 1/1945 | Baugh et al. | 137/563 |
| 2,394,154 A | * | 2/1946 | Curtis | F02M 37/10 |
| | | | | 210/172.3 |
| 2,419,146 A | * | 4/1947 | Kimm et al. | 222/189.11 |
| 2,770,362 A | * | 11/1956 | Paquin | 210/304 |
| 2,863,396 A | * | 12/1958 | Heintz | 417/458 |
| 3,023,905 A | * | 3/1962 | McDougal | B01D 35/027 |
| | | | | 210/172.4 |
| 3,294,025 A | * | 12/1966 | Niemeyer et al. | 210/416.4 |
| 3,314,544 A | * | 4/1967 | Rosaen | 210/172.3 |

(Continued)

FOREIGN PATENT DOCUMENTS

JP 2007-224748 A 9/2007
JP 2011-106421 A 6/2011

OTHER PUBLICATIONS

Cylinder article downloaded from Wikipedia on May 14, 2017, 4 pages.*

*Primary Examiner* — Robert James Popovics
(74) *Attorney, Agent, or Firm* — Posz Law Group, PLC (57) ABSTRACT

A suction filter includes: a casing having an intake port through which fuel is drawn; a filtration member to filter the fuel to be drawn into the intake port; and a wall component which defines a fuel passage for fuel which passes the filtration member toward the intake port. At least a part of the filtration member is located higher than the intake port. The wall component has an upper end positioned higher than the intake port, and the fuel passage is defined so that the fuel flowing through the fuel passage flows over the upper end.

7 Claims, 8 Drawing Sheets

(56) References Cited

U.S. PATENT DOCUMENTS

| | | | |
|---|---|---|---|
| 4,851,118 A * | 7/1989 | Kurihara | 210/315 |
| 4,966,522 A * | 10/1990 | Koyama | 415/121.2 |
| 5,547,568 A * | 8/1996 | Sasaki | 210/172.4 |
| 5,776,341 A * | 7/1998 | Barnard et al. | 210/306 |
| 8,372,278 B1 * | 2/2013 | Nguyen et al. | 210/172.2 |
| 2012/0240901 A1 | 9/2012 | Yamada et al. | |
| 2015/0060349 A1 * | 3/2015 | Ishitoya | B01D 35/0273 210/416.4 |

* cited by examiner

SUCTION FILTER

CROSS REFERENCE TO RELATED APPLICATION

This application is based on Japanese Patent Application No. 2013-182451 filed on Sep. 3, 2013, the disclosure of which is incorporated herein by reference in its entirety.

TECHNICAL FIELD

The present disclosure relates to a suction filter.

BACKGROUND

JP 2012-202230A (US 2012/240901 A1) describes a suction filter which is arranged in a fuel tank of a vehicle.

The suction filter has a filter material and a fuel passage space located on an inner side of the filter material. The fuel passage space is located higher than an intake port of a fuel pump. If fuel sufficiently permeates the filter material to form a fuel (oil) film, air stays in the higher part in the fuel passage space. Further, for example, in case where the vehicle is inclined by a quick turn, if the fuel surface in the suction filter is inclined, much air is rapidly drawn into the intake port. At this time, the fuel pump cannot achieve sufficient fuel discharge performance.

SUMMARY

It is an object of the present disclosure to provide a suction filter in which rapid and large amounts of air drawing from an intake port of a fuel pump is restricted so as to maintain the fuel discharge performance of the fuel pump better.

According to an aspect of the present disclosure, a suction filter has a wall component which is disposed in a fuel passage through which fuel flows from a filtration member to an intake port. The wall component is arranged to define the shape of the fuel passage. The wall component has an upper end positioned higher than the intake port, and the fuel flowing through the fuel passage flows over the upper end.

Accordingly, the fuel pumped by the fuel pump toward the intake port flows through the fuel passage by surely flowing over the upper end of the wall component after being filtered with the filtration member. Therefore, while the fuel passage which extends to the intake port from the filtration member spreads out higher than the intake port, air cannot stay easily due to the fuel which flows over the wall component. Therefore, if the vehicle inclines during hard cornering, or/and if the suction filter inclines, rapid and large amounts of air drawing cannot be easily generated at the intake port. Thus, the fuel discharge performance of a fuel pump can be better maintained.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 1:
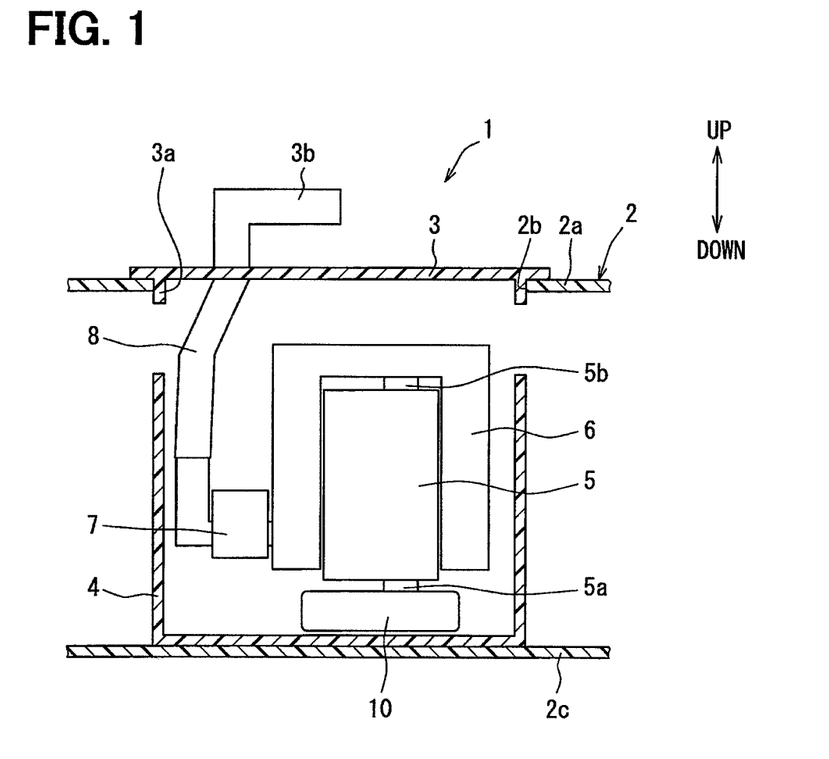
FIG. 1 is a schematic view illustrating a fuel feed system including a suction filter according to a first embodiment.

A first embodiment is described with reference to FIGS. 1-3. A fuel feed system 1 shown in FIG. 1 is mounted to a fuel tank 2 in a vehicle, and supplies fuel from the fuel tank 2 to outside, for example, to an internal-combustion engine. The up-and-down direction in FIGS. 1-3 substantially corresponds to an up-and-down direction (vertical direction) of the vehicle which is parked on the horizontal surface.

As shown in FIG. 1, the fuel feed system 1 includes a flange 3, a subtank 4, a fuel pump 5, a fuel filter 6, a pressure regulator 7, a tube 8, and a suction filter 10.

The flange 3 has, for example, a disk-shape and is made of plastic material. The flange 3 corresponds to a lid component which closes an opening 2b defined in a ceiling part 2a of the fuel tank 2. The flange 3 integrally has a fitting part 3a and a fueling pipe 3b as one-piece component. The fitting part 3a has a ring shape corresponding to the shape of the opening 2b, and corresponds to a cylindrical wall part projected downward from the main part of the flange 3. The fitting part 3a is fitted to the inner side of the opening 2b.

The fueling pipe 3b is formed to define a fuel passage passing through the main part of the flange 3. Fuel pumped by the fuel pump 5 from the fuel tank 2 is supplied to the outside through the fuel passage of the fueling pipe 3b. The flange 3 has an electric connector (not shown) through which electric power is supplied to the fuel pump 5 from outside. Further, a detection signal output from a fuel residual quantity detector (not shown) is transmitted to outside through the electric connector.

The subtank 4 has a cylindrical shape with a base (a "based cylindrical" shape) and is made of plastic material, for example. The subtank 4 is accommodated in the fuel tank 2, and is disposed on a bottom part 2c of the fuel tank 2. The subtank 4 has a jet pump (not shown), which injects extra fuel discharged from the pressure regulator 7 inside. By using the jet flow of fuel, fuel is transported from the fuel tank 2 into the subtank 4. The subtank 4 stores the fuel transported by the jet pump.

The flange 3 and the subtank 4 are connected with each other through a connection part (not shown) such that the relative position can be adjusted in the up-and-down direction. When the flange 3 closes the opening 2b of the fuel tank 2, the undersurface of the bottom part of the subtank 4 is caused to be in contact with the bottom part 2c of the fuel tank 2, due to the connection part.

A pump unit equipped with the fuel pump 5, the fuel filter 6, the pressure regulator 7, and the suction filter 10 is accommodated at a predetermined position in the subtank 4. The fuel pump 5 may be an electric pump, for example, and has an electric motor and an impeller rotated by the electric motor in the pump housing. The impeller of the fuel pump 5 is rotated in a pump chamber, such that fuel drawn through a lower drawing pipe 5a is pressurized in the pump chamber and is discharged through an upper discharge pipe 5b.

The fuel filter 6 is arranged to cover the fuel pump 5 from the outer circumference side and the upper side. As shown in FIG. 2, the fuel filter 6 has a housing 6a and a filter element 6b. The housing 6a has a double tube shape, e.g., an inner tube and an outer tube, and the fuel pump 5 is coaxially arranged on the inner circumference side of the inner tube. The filter element 6b may be a honeycomb-shaped filter material, for example, made of wood pulp. The filter element 6b is accommodated between the inner tube and the outer tube of the housing 6a.

The space in the housing 6a is divided into an upstream space and a downstream space through the filter element 6b. The upstream space in the housing 6a communicates with the discharge pipe 5b of the fuel pump 5. The downstream space in the housing 6a communicates with the inside of the fueling pipe 3b through the inside of the tube 8 shown in FIG. 1. The tube 8 is a flexible tube made of rubber, for example. The tube 8 connects the fuel exit of the housing 6a (refer to FIG. 2) to the upstream end of the fueling pipe 3b at the lower side in FIG. 1.

Figure 2:
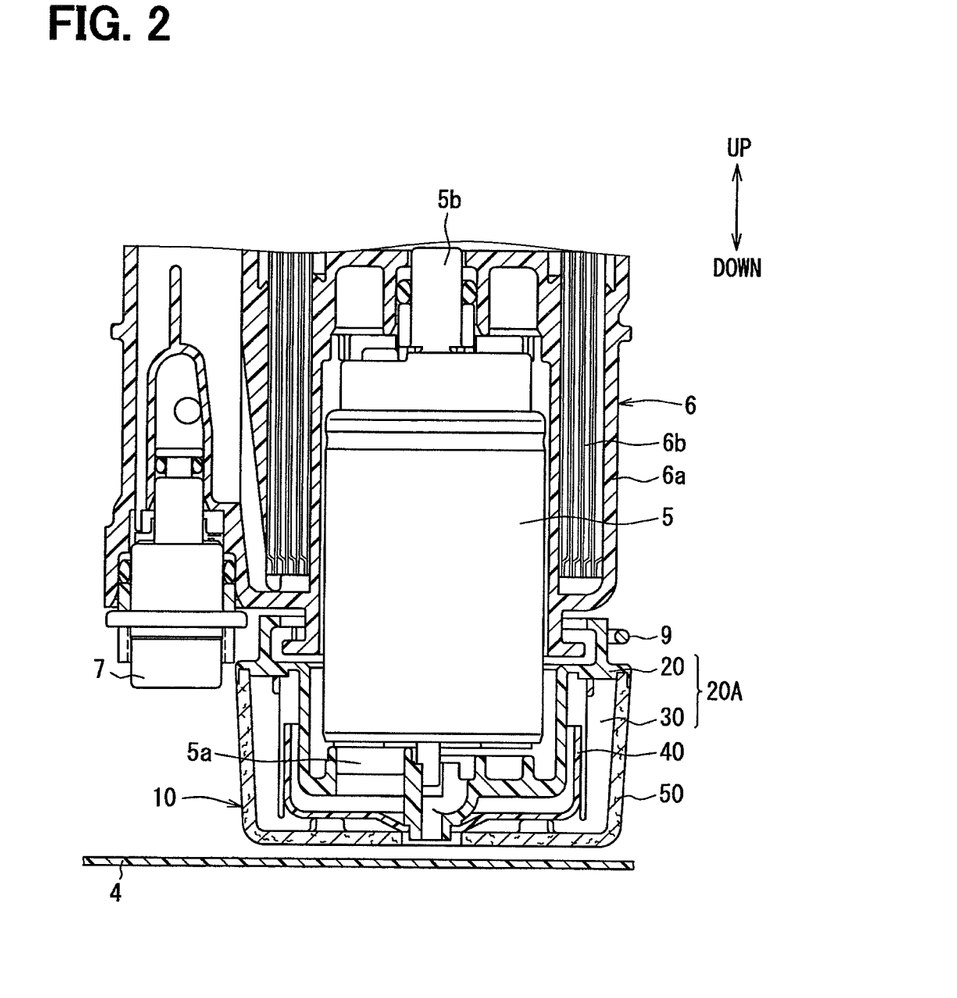
FIG. 2 is a sectional view illustrating the fuel feed system of the first embodiment.

As shown in FIG. 2, the pressure regulator 7 is mounted to the housing 6a. The pressure regulator 7 is a valve device which opens and closes according to the pressure difference between the downstream space in the housing 6a and the inside of the fuel tank 2. When the pressure difference is higher than a predetermined value, the valve device is opened to return the extra fuel into the subtank 4. The pressure regulator 7 adjusts a pressure in the downstream space of the housing 6a to a predetermined pressure with respect to a basis pressure which is a pressure in the fuel tank 2. That is, the pressure regulator 7 adjusts the pressure of fuel, which is supplied by the fuel feed system 1 to the exterior of the fuel tank 2, to have a predetermined pressure.

The suction filter 10 is located under the fuel pump 5, and is located at the lowest position in the pump unit. The suction filter 10 includes a cap 20, a protector 30, a cup object 40, and a filtration member 50. The cap 20 and the protector 30 form a support component 20A which supports the filtration member 50. The cap 20 is fixed to the lower part of the housing 6a, for example, by a clip 9 having a U-shape. Thereby, the suction filter 10 is floatingly held, that is, so as to be spaced from the bottom part of the subtank 4. The cap 20 may correspond to a casing.

Figure 3:
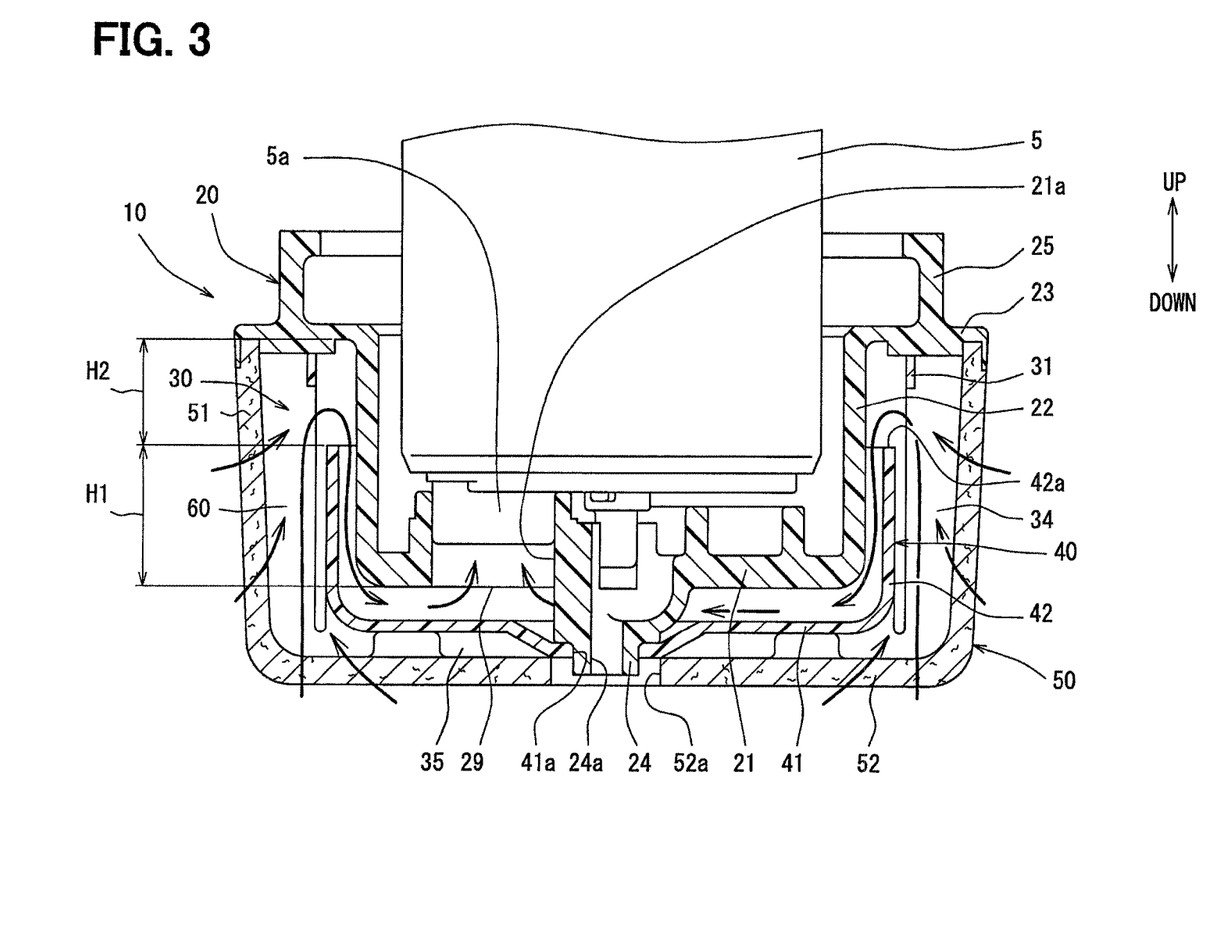
FIG. 3 is a sectional view illustrating the suction filter of the first embodiment.

As shown in FIG. 3, the cap 20 is made of, for example, plastic material integrally molded to have a bottom wall part 21, a pipe wall part 22, a flange part 23, a cylindrical part 24, and a locking part 25. In FIG. 3, illustration of the fuel filter 6 and illustration of the clip 9 are omitted.

The bottom wall part 21 is located under the fuel pump 5 and is formed to spread in a transverse (lateral, horizontal) direction. The pipe wall part 22 has a cylinder shape extending upward from the outer perimeter of the bottom wall part 21. The pipe wall part 22 is coaxially arranged as the outer circumference surface of the pump housing of the fuel pump 5. The flange part 23 is projected from the upper end of the pipe wall part 22 outward in the radial direction around all the circumference. The locking part 25 is projected upward from the upper surface of the flange part 23. The clip 9 is fixed to the locking part 25 when the housing 6a is mounted to the suction filter 10.

The cylindrical part 24 is formed to have a cylindrical shape projected downward from the center of the bottom wall part 21. A fuel passage hole 24a is defined inside the cylindrical part 24. The fuel passage hole 24a is a through hole passing though the bottom wall part 21. Fuel in a space between the fuel pump 5 and the cap 20 can flow downward in the fuel passage hole 24a.

The bottom wall part 21 has a fitting hole 21a passing through the bottom wall part 21 at a side of the projection portion of the cylindrical part 24. The drawing pipe 5a projected downward from the pump housing of the fuel pump 5 is fitted to the fitting hole 21a. When the fuel pump 5 is driven to pump fuel, fuel in the suction filter 10 is drawn from an intake port 29 which is defined by the lower end of the fitting hole 21a, and flows into the pump chamber through the fitting hole 21a and the drawing pipe 5a.

The protector 30 is made of, for example, plastic material integrally molded to have an upper annular part 31, plural ribs 34, and plural ribs 35. In this embodiment, the cup object 40 is also integrally molded with the protector 30. The cup object 40 is made of, for example, plastic material integrally molded to have a bottom part 41 and an annular wall part 42 having a cylindrical shape projected upward from the perimeter edge of the bottom part 41. The bottom part 41 is located under the intake port 29, and the annular wall part 42 is annularly projected from the bottom part 41 to surround the intake port 29. The cup object 40 may correspond to a based cylindrical component in this embodiment. The annular wall part 42 may correspond to a wall component in this embodiment.

The protector 30 has a frame shape in which the upper annular part 31 and the cup object 40 are connected with each other by the plural ribs 34. The plural ribs 34 are arranged to be spaced from each other in a circumferential direction at equal interval, and each of the ribs 34 extends in the up-and-down direction. The radially-inner-side upper end of the rib 34 is connected to the upper annular part 31, and the radially-inner-side lower end of the rib 34 is connected to a terminal section at which the bottom part 41 of the cup object 40 and the annular wall part 42 are connected with each other. The radially-outer-side of the rib 34 is in contact with the inner surface of the filtration member 50.

The plural ribs 35 are projected downward from the undersurface of the bottom part 41 of the cup object 40. The plural ribs 35 are arranged to be spaced from each other in a circumferential direction at equal interval, and each of the ribs 35 extends in the radial direction. The lower side of the rib 35 is in contact with the inner surface of the filtration member 50. The upper surface of the upper annular part 31 and the upper end surface of the rib 34 are joined to the undersurface of the flange part 23 of the cap 20, for example, by welding or adhesive. Only the rib 34 and the rib 35 located the closest to the cross-section illustrated in FIG. 2 and FIG. 3 are shown, and the other ribs 34, 35 are omitted in the illustration in FIG. 2 and FIG. 3.

The bottom part 41 of the cup object 40 has a fitting hole 41a passing through the central portion of the bottom part 41. The cylindrical part 24 of the cap 20 is fitted to the fitting hole 41a, and the cylindrical part 24 and the bottom part 41 are fitted to be liquid-tight with each other, for example, by welding, adhesion, or press-fitting.

The filtration member 50 is formed to have a based cylindrical shape including a pipe part 51 and a bottom part 52 which closes the lower end of the pipe part 51. The filtration member 50 is fabricated to have a shape corresponding to the outer shape of the protector 30, for example, with a soft elastic filter material sheet. The upper end of the pipe part 51 of the filtration member 50 is joined to the undersurface of the flange part 23 of the cap 20, for example, by welding, adhesion, or thermally deforming. A part of the pipe part 51 of the filtration member 50 is located higher than the intake port 29.

The pipe part 51 of the filtration member 50 has a chrysanthemum-like shape, for example in which the radially-outward projection and the radially-inward projection are alternately formed in the circumferential direction. In this case, the rib 34 supports the filtration member 50 by contacting the radially-inner surface of the radially-outward projection which extends in the up-and-down direction. The bottom part 52 of the filtration member 50 has, for example, a plate shape, and is approximately parallel relative to the bottom part of the subtank 4 with a clearance therebetween (refer to FIG. 1 and FIG. 2). The rib 35 is in contact with the upper surface of the bottom part 52 of the filtration member 50 so as to support the filtration member 50. The bottom part 52 of the filtration member 50 has a through hole 52a at the center so as not to affect the fuel flowing through the fuel passage hole 24a of the cap 20.

The filter material sheet of the filtration member 50 may be made of a monolayer nonwoven fabric, a multilayer nonwoven fabric, a mesh cloth, or a filter paper. Alternatively, the filter material sheet of the filtration member 50 may be provided by layering at least two kinds of the monolayer nonwoven fabric, the multilayer nonwoven fabric, the mesh cloth, and the filter paper. Moreover, the filter material sheet of the filtration member 50 may be provided by layering a cover member to cover a foreign object collecting member which is selected among the monolayer nonwoven fabric, the multilayer nonwoven fabric, the mesh cloth, and the filter paper. The cover member is more coarse than the foreign object collecting member.

The suction filter 10 has a fuel passage 60 located on the inner side of the filtration member 50 in the radial direction. Fuel passing through the filtration member 50 flows into the intake port 29 through the fuel passage 60. The cup object 40 is arranged in the fuel passage 60, and the annular wall part 42 has a height extending higher than the intake port 29 for all of the circumference. In FIG. 3, a distance H1 is defined between the intake port 29 and the upper end 42a of the annular wall part 42 in the up-and-down direction, and a distance H2 is defined between the upper end 42a of the annular wall part 42 and the topmost part of the fuel passage 60 in the up-and-down direction. The cup object 40 is arranged so that the distance H2 becomes smaller than the distance H1.

When the fuel pump 5 is driven, fuel in the subtank 4 passes the filtration member 50 of the suction filter 10, and a comparatively big foreign object is caught at this time. The fuel filtered with the filtration member 50 is drawn into the intake port 29. The fuel drawn from the intake port 29 is pressurized by the fuel pump 5, and is discharged out into the housing 6a of the fuel filter 6. The fuel passing through the housing 6a is filtered by the filter element 6b having a mesh finer than that of the filtration member 50, such that a comparatively small foreign object is caught. The pressure of fuel filtered by the filter element 6b is controlled by the pressure regulator 7, and is supplied to outside of the fuel tank 2.

Thus, when fuel flows from the filtration member 50 to the intake port 29, in the suction filter 10, the fuel flows through the fuel passage 60. The cup object 40 is disposed in the fuel passage 60, and defines the shape of the fuel passage 60. Thereby, as shown in FIG. 3, while the fuel passing through the filtration member 50 moves from the space between the filtration member 50 and the cup object 40 to the inner space of the cup object 40, the fuel flows upward up to the upper end 42a of the annular wall part 42 and then flows downward.

The suction filter 10 has the annular wall part 42 positioned in the fuel passage 60 through which fuel flows from the filtration member 50 to the intake port 29, and the annular wall part 42 defines the fuel passage 60. The upper end 42a of the annular wall part 42 is positioned higher than the intake port 29. The annular wall part 42 defines the fuel passage 60 such that the fuel flowing through the fuel passage 60 flows upward up to the upper end 42a and then flows downward.

The fuel pumped by the fuel pump 5 to the intake port 29 flows through the fuel passage 60 and flows over the upper end 42a of the annular wall part 42 after being filtered with the filtration member 50. While the fuel passage 60 extending from the filtration member 50 to the intake port 29 spreads out to the position higher than the intake port 29, air cannot easily stay in the upper part of the fuel passage 60 due to the fuel which flows through the upper space of the fuel passage 60 and flows over the annular wall part 42. Therefore, if the vehicle is inclined and if the suction filter 10 is inclined, much air is not drawn at one time from the intake port 29. Thus, the fuel discharge performance of the fuel pump 5 can be better maintained.

Moreover, the annular wall part 42 is formed to surround the intake port 29. According to this, fuel to be drawn into the intake port 29 flows over the annular wall part 42 provided to surround the intake port 29. Therefore, air is certainly restricted from staying at the upper part of the fuel passage 60 due to the fuel flowing over the annular wall part 42. Thus, the fuel discharge performance of the fuel pump 5 can be better maintained with certainty.

The suction filter 10 is equipped with the cup object 40 which has the bottom part 41 located under the intake port 29 and the annular wall part 42 annularly projected from the bottom part 41 to surround the intake port 29. The annular wall part 42 may correspond to a wall component in this embodiment, and the annular wall part 42 is risen to a position higher than the intake port 29.

According to this, the fuel pumped by the fuel pump 5 into the intake port 29 flows through the fuel passage 60 and definitely flows over the annular wall part 42, at the upper part opposite from the bottom part 41 of the cup object 40, after being filtered with the filtration member 50. Therefore, because the fuel passage 60 extending from the filtration member 50 to the intake port 29 spreads out higher than the intake port 29, and due to the fuel which flows through the top space of the fuel passage 60 by flowing over the annular wall part 42, air can be more certainly restricted from staying at the upper part of the fuel passage 60. Thus, the fuel discharge performance of the fuel pump 5 can be better maintained better with certainty.

Figure 4:
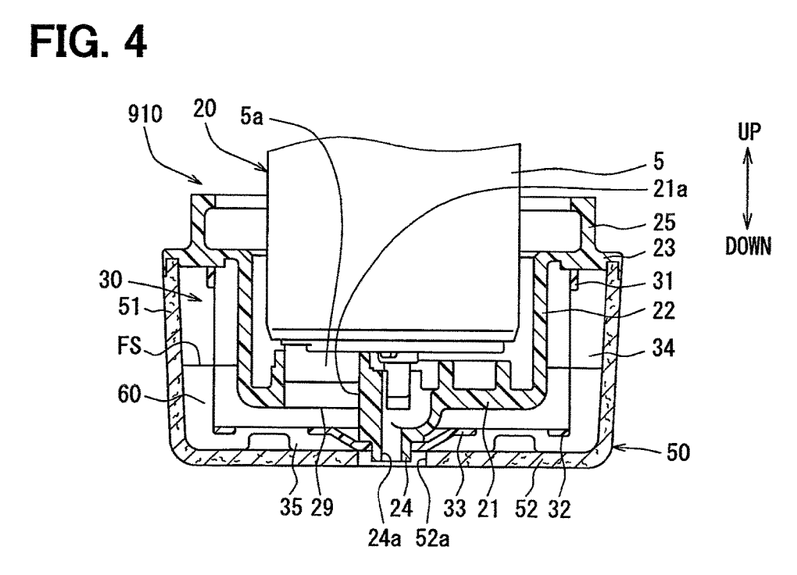
FIG. 4 is a sectional view illustrating a suction filter of a comparative example.
Figure 5:
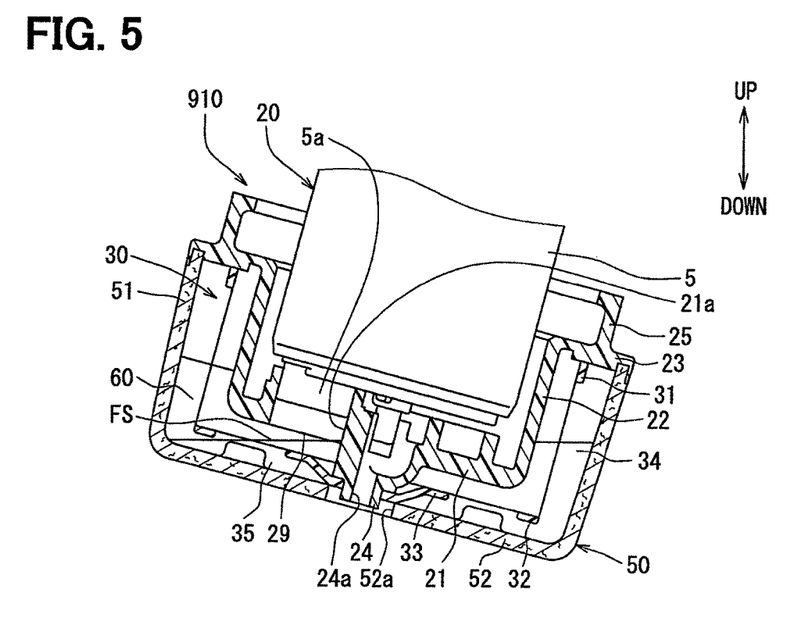
FIG. 5 is a sectional view illustrating the suction filter of the comparative example in the inclined state.

A suction filter 910 of a comparative example shown in FIGS. 4 and 5 is not equipped with the cup object 40, but is equipped with the lower annular part 32 located under the upper annular part 31, and the central annular part 33 located in the inner side of the lower annular part 32. The ribs 34 and 35 are arranged to connect the annular parts 31, 32, and 33 with each other. The other structure is approximately the same as that of the suction filter 10 of the first embodiment.

When fuel permeates the filtration member 50, a film of fuel (oil) is easily formed at the upper part in the suction filter 910, where the flow velocity of fuel is comparatively slow. Therefore, as shown in FIG. 4, air more easily stays at the upper part in the space inner than the filtration member 50. As shown in FIG. 5, if the fuel surface FS (interface of fuel and air) is inclined, for example, by the inclination of the vehicle in the state where air stagnated, much air is drawn at one time from the intake port 29. In connection with this, it becomes difficult for the fuel pump 5 to perform sufficient fuel discharge. In contrast, according to the suction filter 10 of the first embodiment, such fault can be prevented.

According to the first embodiment, the annular wall part 42 of the cup object 40 has risen to the position higher than the intake port 29 all the circumference. According to this, all the fuel pumped by the fuel pump 5 into the intake port 29 flows through the fuel passage 60 by definitely flowing over the annular wall part 42 at a position higher than the intake port 29. Therefore, while the fuel passage 60 extending from the filtration member 50 to the intake port 29 spreads out higher than the intake port 29, air can be more certainly restricted from staying in the upper part of the fuel passage 60. Thus, rapid and large amounts of air drawing from the intake port 29 can be restricted much more certainly, and the fuel discharge performance of the fuel pump 5 can be better maintained with much more certainty.

Moreover, the annular wall part 42 of the cup object 40 is formed so that the distance H2 between the upper end 42a of the annular wall part 42 and the topmost part of the fuel passage 60 in the up-and-down direction becomes smaller than the distance H1 between the intake port 29 and the upper end 42a of the annular wall part 42 in the up-and-down direction. According to this, a space higher than the upper end 42a of the annular wall part 42 can be made comparatively smaller, of the fuel passage space extending to the intake port 29 from the filtration member 50. Therefore, air can be much more certainly restricted from staying in the fuel passage space. Thus, rapid and large amounts of air drawing from the intake port 29 can be restricted much more certainly, and the fuel discharge performance of the fuel pump 5 can be better maintained with much more certainty.

Second Embodiment

Figure 6:
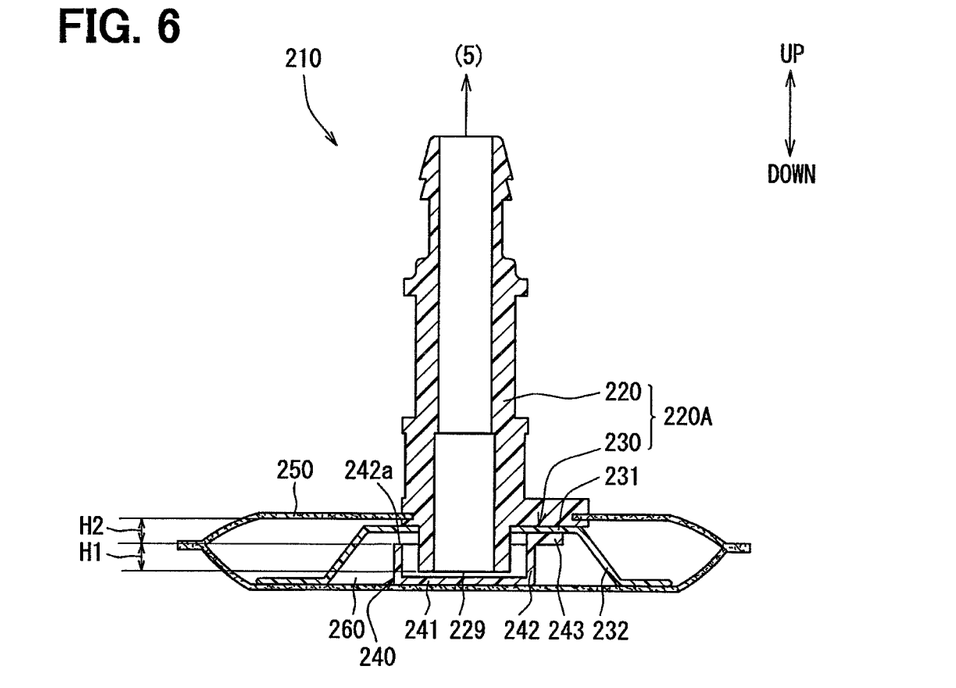
FIG. 6 is a sectional view illustrating a suction filter according to a second embodiment.

A second embodiment is described based on FIG. 6.
In the second embodiment, the suction filter of the present disclosure is applied to a suction filter which has a bag-shaped filtration member.

As shown in FIG. 6, a suction filter 210 according to the second embodiment includes a pipe component 220, a core component 230, a cup object 240, and a filtration member 250. The pipe component 220 and the core component 230 correspond to a support component 220A which supports the filtration member 250.

The pipe component 220 is made of, for example, plastic material, and has a cylinder shape. The upper part of the pipe component 220 is connected to the fuel pump 5 directly or through a pipe component. The lower end of the pipe component 220 defines an intake port 229.

The core component 230 is made of, for example, plastic material integrally molded to have a connector 231 and a shape-keeping part 232. The connector 231 has the shape of a ring board, and is connected to the lower part of the pipe component 220. The filtration member 250 has the shape of a bag which can be expanded or contracted in the up-and-down direction. The shape-keeping part 232 has the shape of a board spreading from the connector 231 outward and downward, and holds the filtration member 250 in the bag-expanded state. The shape-keeping part 23 has plural slits extending, for example, in the radial direction, and fuel can flow in the radial direction through the slit.

The cup object 240 is integrally molded to have a bottom part 241, an annular wall part 242 and a connection piece part 243. The annular wall part 242 has a cylindrical shape projected upward from the perimeter edge of the bottom part 241. The connection piece part 243 radially extends from the annular wall part 242 at a predetermined position in the circumferential direction. The bottom part 241 is located under the intake port 229, and the annular wall part 242 is annularly projected from the bottom part 241 to surround the intake port 229. The connection piece part 243 is connected to the undersurface of the connector 231 of the core component 230. The cup object 240 may correspond to a based cylindrical component in this embodiment. The annular wall part 242 may correspond to a wall component in this embodiment. The annular wall part 242 may be referred to as a surrounding wall part or an encirclement wall part.

The pipe component 220 and the core component 230 are connected to each other, for example, by welding or adhesive. The core component 230 and the cup object 240 are connected to each other, for example, by welding or adhesive.

The filtration member 250 is formed to have the shape of a bag or sack. The filtration member 250 is arranged to cover the core component 230. The upper part of the filtration member 250 is joined to the perimeter surface of the pipe component 220 by welding, adhesion, snap-fit engaging, insert molding or thermal deforming, for example. The filtration member 250 can be formed with the same filter material sheet as the filtration member 50 of the first embodiment. A part of the filtration member 250 is located higher than the intake port 229.

The suction filter 210 has the fuel passage 260 which extends to the intake port 229 via the filtration member 250, on the inner side of the filtration member 250. The cup object 240 is arranged in the fuel passage 260, and the annular wall part 242 has risen to the upper position higher than the intake port 229 all the circumference. Moreover, the cup object 240 is arranged so that the distance H2 between the upper end 242a of the annular wall part 242 and the topmost part of the fuel passage 260 in the up-and-down direction is smaller than the distance H1 between the intake port 229 and the upper end 242a of the annular wall part 242 in the up-and-down direction.

According to the suction filter 210 which is arranged at the fuel passage 260 extending from the filtration member 250 to the intake port 229, the annular wall part 242 defines the fuel passage 260. The upper end 242a of the annular wall part 242 is positioned higher than the intake port 229, and the annular wall part 242 defines the shape of the fuel passage 260 so that fuel flowing through the fuel passage 260 flows over the upper end 242a.

According to this, the fuel pumped by the fuel pump 5 into the intake port 229 flows through the fuel passage 260 by flowing over the upper end 242a of the annular wall part 242 after being filtered with the filtration member 250. Therefore, although the fuel passage 260 extending to the intake port 229 from the filtration member 250 spreads out higher than the intake port 229, due to the fuel which flows by flowing over the annular wall part 242, air cannot easily stagnate in the upper part of the fuel passage 260. Therefore, if the vehicle inclines, or if the suction filter 210 inclines, rapid and large amounts of air drawing from the intake port 229 can be restricted. Thus, the fuel discharge performance of the fuel pump 5 can be better maintained.

Moreover, the annular wall part 242 is formed to surround the intake port 229. According to this, fuel to be drawn into the intake port 229 can flow along the annular wall part 242 upward and downward, which is surrounded by the intake port 229. Therefore, air can be restricted with certainty from stagnating in the upper part of the fuel passage 260, due to the fuel which flows by flowing over the annular wall part 242. Thus, the fuel discharge performance of the fuel pump 5 can be better maintained with certainty.

The suction filter 210 includes the cup object 240 which has the bottom part 241 located under the intake port 229, and the annular wall part 242 annularly projected from the bottom part 241 to surround the intake port 229. A wall component in this embodiment correspond to the annular wall part 242, and the annular wall part 242 has risen to a position higher than the intake port 229.

According to this, fuel drawn by the fuel pump 5 into the intake port 229 flows through the fuel passage 260 by flowing over the annular wall part 242 on the upper side opposite from the bottom part 241 of the cup object 240, after being filtered with the filtration member 250. Therefore, while the fuel passage 260 extending to the intake port 229 from the filtration member 250 spreads out to a position higher than the intake port 229, due to the fuel which flows through the top space of the fuel passage 260 to flow the annular wall part 242, air can be more certainly restricted from stagnating in the upper part of the fuel passage 260. Thus, the fuel discharge performance of the fuel pump 5 can be better maintained with more certainty.

Moreover, the annular wall part 242 of the cup object 240 has risen to a position higher than the intake port 229 all the circumference. According to this, all the fuel pumped by the fuel pump 5 into the intake port 229 flows through the fuel passage 260 definitely flowing over the annular wall part 242 at a position higher than the intake port 229. Therefore, if the fuel passage 260 extedning to the intake port 229 from the filtration member 250 spreads out higher than the intake port 229, air can be restricted much more certainly from stagnating in the upper part of the fuel passage 260. Thus, rapid and large amounts of air drawing from the intake port 229 can be much more certainly restricted, and the fuel discharge performance of the fuel pump 5 can be much more certainly prevented from deteriorating.

Moreover, the annular wall part 242 of the cup object 240 is formed so that the distance H2 between the upper end 242a of the annular wall part 242 and the topmost part of the fuel passage 260 in the up-and-down direction is smaller than the distance H1 between the intake port 229 and the upper end 242a of the annular wall part 242 in the up-and-down direction. According to this, a space higher than the upper end 242a of the annular wall part 242 can be made comparatively smaller, of the fuel passage space extending to the intake port 229 from the filtration member 250. Therefore, air can be much more certainly restricted from stagnating in the fuel passage space. Thus, rapid and large amounts of air drawing from the intake port 229 can be much more certainly restricted, and the lowering in the fuel discharge performance of the fuel pump 5 can be much more certainly prevented.

Third Embodiment

A third embodiment is described based on FIG. 7-FIG. 14.

In the third embodiment in contrast to the second embodiment, the cup object is replaced with a surrounding object, which is disposed on the inner side of a filtration member.

Figure 7:
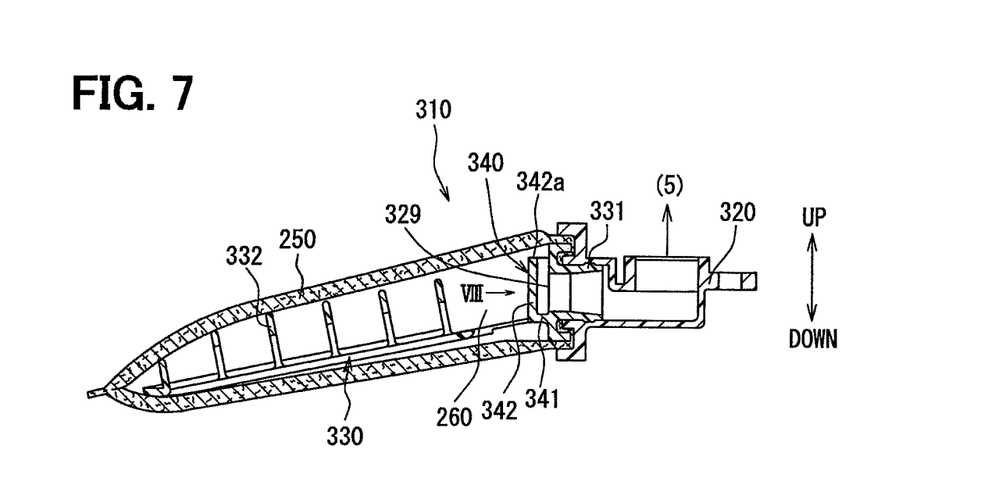
FIG. 7 is a sectional view illustrating a suction filter according to a third embodiment.

As shown in FIG. 7, a suction filter 310 according to the third embodiment includes a cap 320, a core component 330, a surrounding object 340, and a filtration member 250. The cap 320 and the core component 330 may correspond to a support component which supports the filtration member 250.

The cap 320 is made of plastic material, and has the shape of an angled cylinder, in other words, the shape of L-character in this embodiment. The upper opening of the cap 320 is connected to the fuel pump 5 directly or through a pipe component.

The core component 330 is made of plastic material integrally molded to have a connector 331 and a shape-keeping part 332. The connector 331 has a cylindrical shape, and is inserted, for example, by press-fitting into the left opening of the cap 320 in FIG. 7, such that the core component 330 and the cap 320 are connected with each other. The connection between the cap 320 and the core component 330 is not limited to the press-fitting, and may be welding, adhesion, or the like. The intake port 329 is defined by the left end opening of the connector 331.

The filtration member 250 has the shape of a bag which can be expanded and contracted in the up-and-down direction. The shape-keeping part 332 corresponds to a frame object having plural pillars and plural beams connected mutually, and holds the filtration member 250 in the expanded state. The shape-keeping part 332 defines a space inside of the frame object, and fuel can flow the space.

The surrounding object 340 is made of, for example, plastic material integrally molded to have a bottom part 341 and a surrounding wall part 342 projected upward from the perimeter edge of the bottom part 341. The surrounding wall part 342 has a U-shaped cross-section. The surrounding object 340 is integrally fabricated with the core component 330 in this embodiment. The bottom part 341 is located on the lower side as the lowest part of the intake port 329, and the surrounding wall part 342 is projected from the bottom part 341 to surround the intake port 329. The surrounding object 340 may correspond to a surrounding object or an encirclement object, and the surrounding wall part 342 may correspond to a surrounding wall part or an encirclement wall part.

Figure 8:
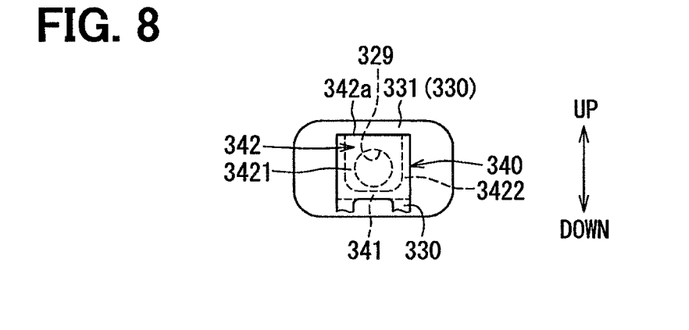
FIG. 8 is a schematic side view seen in a direction of VIII in FIG. 7.

As shown in FIG. 8, the surrounding wall part 342 is integrally molded to have a front wall part 3421 opposing to the intake port 329 through a clearance, and a side wall part 3422 which connects the both-sides edge of the front wall part 3421 to the connector 331. The surrounding wall part 342 is formed to surround the intake port 329 throughout in the circumferential direction, except for a portion adjacent to the connector 331, with the height corresponding to the height of the intake port 329, as shown on the right side in FIG. 7. The surrounding wall part 342 may correspond to a wall component in this embodiment.

As shown in FIG. 7, the filtration member 250 is formed into the shape of a bag. The filtration member 250 is arranged to cover the shape-keeping part 332 of the core component 330. The right end portion of the filtration member 250 shown in FIG. 7 is joined to the perimeter surface of the connector 331 by, for example, welding, adhesion, snap-fit engaging, insert molding or thermal deforming. A part of the filtration member 250 is located higher than the intake port 329.

The suction filter 310 has the fuel passage 260, and fuel flows in the fuel passage 260 from the filtration member 250 to the intake port 329, on the inner side of the filtration member 250. The surrounding object 340 is arranged at the fuel passage 260, and the surrounding wall part 342 has risen to a position higher than the intake port 329 throughout in the circumferential direction in which the intake port 329 is surrounded. In this embodiment, the surrounding wall part 342 extends to a position higher than the topmost part of the intake port 329 throughout in the circumferential direction.

Therefore, when fuel moves from the space defined by the shape-keeping part 332 in the filtration member 250 to the space on the inner side of the surrounding object 340 after passing the filtration member 250, the fuel flows over the upper end 342a of the surrounding wall part 342.

Moreover, the surrounding object 340 is arranged so that a distance between the upper end 342a of the surrounding wall part 342 and the topmost part of the fuel passage 260 in the up-and-down direction is smaller than a distance between the intake port 329 and the upper end 342a in the up-and-down direction. In this embodiment, the distance between the upper end 342a and the topmost part of the fuel passage 260 in the up-and-down direction is smaller than the distance between the topmost part of the intake port 329 and the upper end 342a in the up-and-down direction.

According to the suction filter 310, the surrounding wall part 342 is arranged at the fuel passage 260 extending to the intake port 329 from the filtration member 250, and the surrounding wall part 342 defines the shape of the fuel passage 260. The upper end 342a of the surrounding wall part 342 is positioned higher than the intake port 329, and the surrounding wall part 342 defines the fuel passage 260 so that the fuel flowing through the fuel passage 260 climbs over the upper end 342a.

According to this, fuel to be drawn into the intake port 329 by the fuel pump 5 is filtered with the filtration member 250, and flows through the fuel passage 260 by flowing over the upper end 324a of the surrounding wall part 342. Therefore, although the fuel passage 260 extending to the intake port 329 from the filtration member 250 spreads out higher than the intake port 329, air cannot easily stagnate in the upper part of the fuel passage 260 due to the fuel flowing over the surrounding wall part 342. Therefore, if the vehicle inclines, and/or if the suction filter 310 inclines, rapid and large amounts of air drawing from the intake port 329 can be restricted. Thus, the fuel discharge performance of the fuel pump 5 can be better maintained.

Moreover, the surrounding wall part 342 is formed to surround the intake port 329. According to this, fuel to be drawn into the intake port 329 flows by flowing over the surrounding wall part 342 disposed to surround the intake port 329. Therefore, air can be certainly restricted from stagnating in the upper part of the fuel passage 260 due to the fuel definitely flowing over the surrounding wall part 342. Thus, the fuel discharge performance of the fuel pump 5 can certainly be prevented from deteriorating.

Moreover, the suction filter 310 is equipped with the surrounding object 340 which has the bottom part 341 located under the intake port 329, and the surrounding wall part 342 projected from the bottom part 341 to surround the intake port 329. The wall component in this embodiment may be formed of the surrounding wall part 342, and the surrounding wall part 342 has risen to the position higher than the intake port 329.

According to this, the fuel pumped by the fuel pump 5 into the intake port 329 flows through the fuel passage 260 by flowing over the surrounding wall part 342 in the upper part opposite from the bottom part 341 of the surrounding object 340, after being filtered with the filtration member 250. Therefore, though the fuel passage 260 extending to the intake port 329 from the filtration member 250 spreads out higher than the intake port 329, due to the fuel which flows through the top space of the fuel passage 260 by flowing over the surrounding wall part 342, air can be more certainly restricted from stagnating in the upper part of the fuel passage 260. Thus, the fuel discharge performance of the fuel pump 5 can be better maintained with more certainty.

Moreover, the surrounding wall part 342 has risen to the position higher than the intake port 329 throughout in the circumferential direction. According to this, all the fuel pumped by the fuel pump 5 toward the intake port 329 flows through the fuel passage 260 by flowing over the surrounding wall part 342 at a position higher than the intake port 329. Therefore, if the fuel passage 260 extending to the intake port 329 from the filtration member 250 spreads out higher than the intake port 329, air can be much more certainly restricted from stagnating in the upper part of the fuel passage 260. Thus, rapid and large amounts of air drawing from the intake port 329 can be certainly restricted, and the fuel discharge performance of the fuel pump 5 can much more certainly be prevented from deteriorating.

Moreover, the surrounding wall part 342 is formed so that the distance between the upper end 342a and the topmost part of the fuel passage 260 in the up-and-down direction is smaller than the distance between the intake port 329 and the upper end 342a in the up-and-down direction. According to this, the space higher than the upper end 342a of the surrounding wall part 342 can be made comparatively smaller, of the fuel passage space extending to the intake port 329 from the filtration member 250. Therefore, air can be much more certainly restricted from stagnating in the fuel passage space. Thus, rapid and large amounts of air drawing from the intake port 329 can be much more certainly restricted, and the fuel discharge performance of the fuel pump 5 can be much more certainly prevented from deteriorating.

In this embodiment, the surrounding object 340 and the connector 331 may form a based cylindrical component, and it can be said that the intake port 329 is an opening defined on the side surface of the based cylindrical component.

Figure 9:
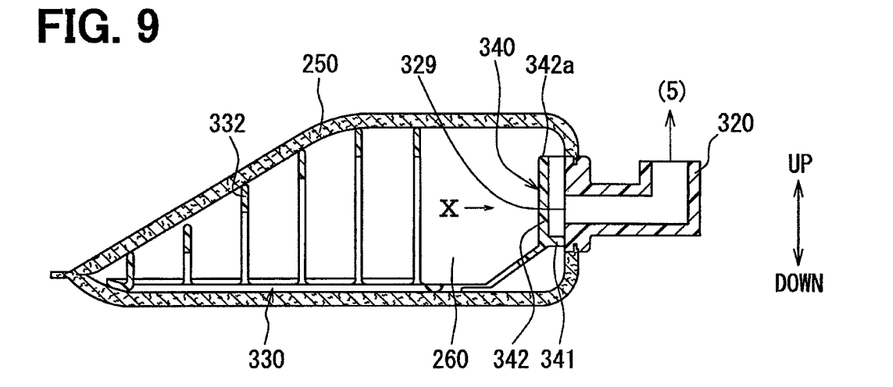
FIG. 9 is a sectional view illustrating a suction filter according to a first modification of the third embodiment.

In the third embodiment explained using FIG. 7 and FIG. 8, the surrounding object 340 is integrally molded, but is not limited to this. For example, as shown in FIG. 9 and FIG. 10, the front wall part 3421 of the surrounding wall part 342 may be integrally molded with the bottom part 341, and the side wall part 3422 of the surrounding wall part 342 may be integrally molded with the cap 320 in which the intake port 329 is defined.

Figure 10:
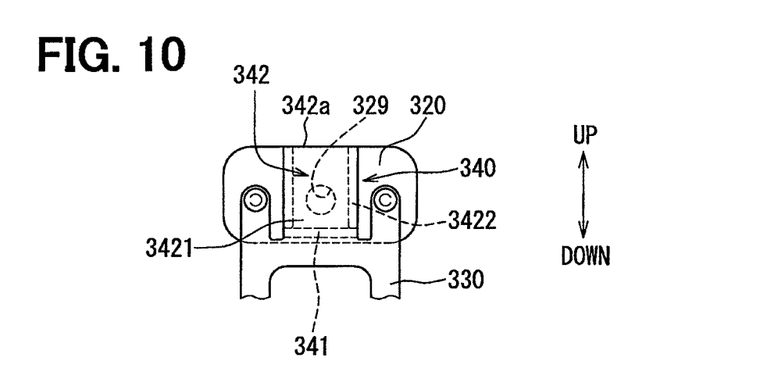
FIG. 10 is a schematic side view seen in a direction of X in FIG. 9.

In the modification shown in FIG. 10, the core component 330 is connected to the cap 320, for example, by thermal deforming, on both sides of the surrounding object 340. The connection between the cap 320 and the core component 330 is not limited to the thermal deforming, but may be welding, adhesion, snap-fit, and the like.

Figure 11:
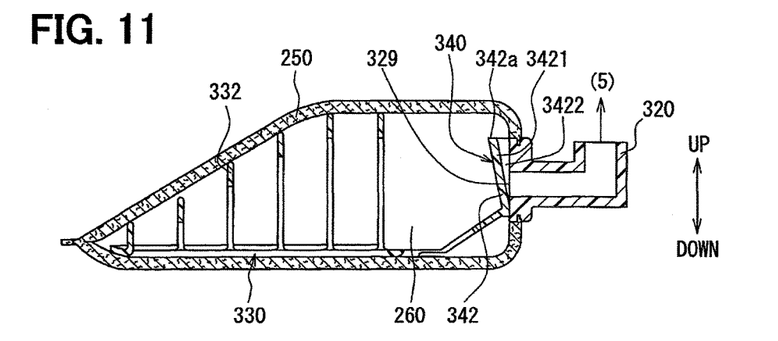
FIG. 11 is a sectional view illustrating a suction filter according to a second modification of the third embodiment.

In FIGS. 7-10, the surrounding object 340 includes the bottom part 341 and the surrounding wall part 342, but is not limited to this. For example, as shown in FIG. 11, the front wall part 3421 of the surrounding wall part 342 is made to incline relative to the intake port, and the bottom part may be eliminated.

Figure 12:
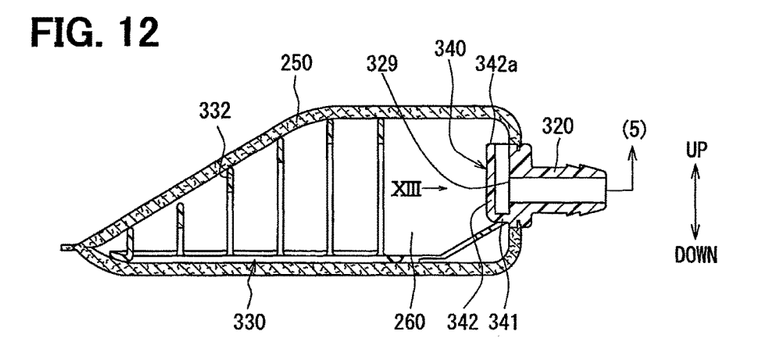
FIG. 12 is a sectional view illustrating a suction filter according to a third modification of the third embodiment.
Figure 13:
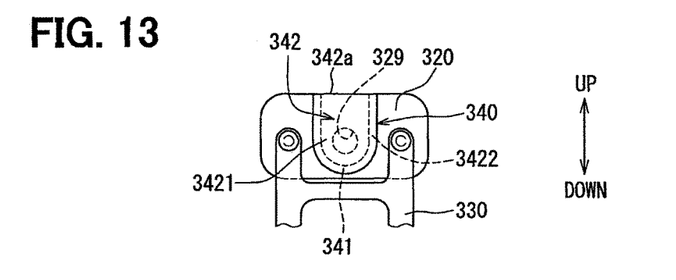
FIG. 13 is a schematic side view seen in a direction of XIII in FIG. 12.

In the third embodiment explained using FIG. 7 and FIG. 8, the surrounding object 340 is integrally molded with the core component 330, but is not limited to this. For example, as shown in FIG. 12 and FIG. 13, the surrounding object 340 may be integrally molded with the cap 320 in which the intake port 329 is formed. In FIG. 13, the core component 330 is connected to the cap 320 by thermal deforming applied to the both sides of the surrounding object 340. The connection between the cap 320 and the core component 330 is not limited to the thermal deforming, but may be welding, adhesion, a snap fit, etc.

Figure 14:
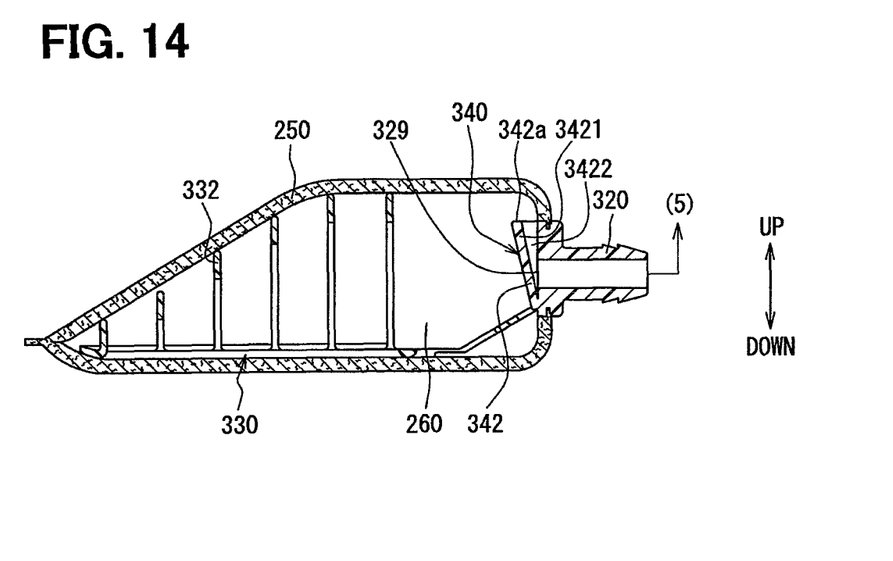
FIG. 14 is a sectional view illustrating a suction filter according to a fourth modification of the third embodiment.

In FIG. 12 and FIG. 13, the surrounding object 340 has the bottom part 341 and the surrounding wall part 342, but is not limited to this. For example, as shown in FIG. 14, the front wall part 3421 of the surrounding wall part 342 is made to incline relative to the intake port, and the bottom part may be eliminated.

Other Embodiment

The present disclosure is not limited to the above embodiments.

In the first and second embodiments, the annular wall part is formed so that the distance H2 between the upper end of an annular wall part and the topmost part of a fuel passage in the up-and-down direction becomes smaller than the distance H1 between the intake port and the upper end of an annular wall part in the up-and-down direction. However, it is not limited to this.

In the third embodiment, the surrounding wall part is formed so that the distance between the upper end of a surrounding wall part and the topmost part of a fuel passage in the up-and-down direction becomes smaller than the distance between the intake port and the upper end of a surrounding wall part in the up-and-down direction. However, it is not limited to this.

The distance between the upper end of an annular wall part or a surrounding wall part and the topmost part of a fuel passage in the up-and-down direction may be larger than or equal to the distance between the intake port and the upper end of an annular wall part or a surrounding wall part in the up-and-down direction.

In the first and second embodiments, the annular wall part 42, 242 of the cup object 40, 240 extends to the position higher than the intake port 29, 229 all the circumference. However, it is not limited to this. For example, a part of an annular wall part may be located lower than an intake port in the circumferential direction.

In the third embodiment, the surrounding wall part 342 of the surrounding object 340 extends to the position higher than the intake port 329 throughout the circumferential direction. However, it is not limited to this. For example, a part of a surrounding wall part may be located lower than an intake port in the circumferential direction.

In the first embodiment, the cup object 40 is integrally molded with the protector 30. However, it is not limited to this. For example, the cup object 40 and the protector 30 may be manufactured separately from each other, and then connected with each other.

In the second embodiment, the cup object 240 is fabricated separately from the core component 230, and is joined to the core component 230. However, it is not limited to this. For example, the cup object 240 and the core component 230 may be integrally molded. Moreover, the cup object 40, 240 is not limited to be integrally molded, but may be formed combining two or more components.

Figure 15:
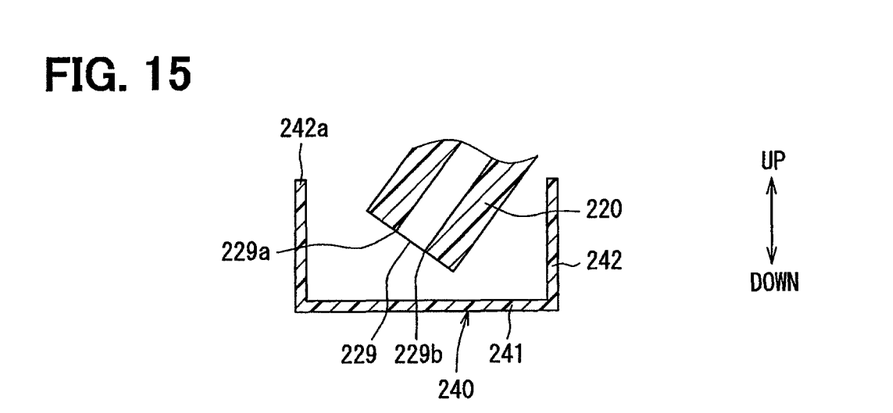
FIG. 15 is a sectional view illustrating a part of a suction filter according to other embodiment.

In the first and second embodiments, the intake port 29, 229 which draws fuel in a suction filter by the fuel pump 5 is not limited to have the opening surface which spreads in the transverse direction. For example, as shown in FIG. 15, as a modification in the suction filter 210 of the second embodiment, the opening surface of the intake port 229 may be inclined relative to the surfaces of the cup object 240. In this case, the annular wall part 242 extends to the position higher than, at least, the lower end 229b of the intake port 229. Furthermore, as shown in FIG. 15, the annular wall part 242 is desirably extended to the position higher than the upper end 229a of the intake port 229.

In the above embodiments, all the fuel passing through a filtration member toward the intake port flows over the upper end of an annular wall part or a surrounding wall part, but it is not limited to this. For example, a part of the fuel may flow without flowing over the upper end of an annular wall part or a surrounding wall part, while most of the fuel flows by flowing over the upper end of an annular wall part or a surrounding wall part.

In the first and second embodiments, the annular wall part which is a wall component is provided to surround an intake port all the circumference. In the third embodiment, the surrounding wall part which is a wall component is provided to surround the intake port throughout in the circumferential direction except a portion where the intake port is formed. However, it is not limited to this. For example, a board-shaped wall component may be prepared in a fuel passage as a component which controls the fuel to flow straightly, and the fuel passage may be defined by the wall component so that the great portion of fuel which flows in the fuel passage flows over the upper end of the wall component. In this case, while the upper end of the wall component is positioned higher than the intake port, the wall component may be arranged at a limited range in the circumferential direction in which an intake port is surrounded.

Such changes and modifications are to be understood as being within the scope of the present disclosure as defined by the appended claims.

What is claimed is:

1. A suction filter for placement within and for filtering fuel in a fuel tank of a vehicle, the suction filter comprising:
   an intake port for location of the suction filter in the fuel tank of the vehicle, fuel being drawn from the fuel tank into the intake port by a fuel pump of the fuel tank;
   a filtration member for arrangement of the suction filter in the fuel tank to filter the fuel to be drawn into the intake port, at least a part of the filtration member being located higher than the intake port;
   a wall component disposed in a fuel passage, the fuel passage extends from the filtration member to the intake port so as to define a shape of the fuel passage, wherein the wall component has an upper end positioned higher than the intake port, and the fuel passage is defined so that the fuel flowing through the fuel passage flows over the upper end, the wall component is arranged inside the filtration member; and a support component that supports the filtration member, wherein the support component includes
- a pipe wall part coaxially arranged with the filtration member and the wall component,
- a bottom wall part arranged at an axial end of the pipe wall part,
- a flange part projected from an upper end of the pipe wall part outward in a radial direction, an upper end of the filtration member is connected to the flange part, and
- a locking part for attachment to the fuel pump.

2. The suction filter according to claim 1, wherein the wall component is formed so that a distance between the upper end of the wall component and a topmost part of the fuel passage in an up-and-down direction is smaller than a distance between the intake port and the upper end of the wall component in the up-and-down direction.

3. The suction filter according to claim 1, wherein the bottom wall part of the support component is arranged inside the wall component, and the fuel passage is defined between the bottom wall part and the wall component downstream of the upper end of the wall component in a fuel flowing direction.

4. The suction filter according to claim 1, wherein the bottom wall part has a hole passing through the bottom wall part, and the intake port is defined by a lower end of the hole.

5. The suction filter according to claim 1, wherein the bottom wall part is formed to spread in a transverse direction.

6. A suction filter for placement within and for filtering fuel in a fuel tank of a vehicle, the suction filter comprising:

an intake port for location of the suction filter in the fuel tank of the vehicle, fuel being drawn from the fuel tank into the intake port by a fuel pump of the fuel tank;

a filtration member for arrangement of the suction filter in the fuel tank to filter the fuel to be drawn into the intake port, at least a part of the filtration member being located higher than the intake port, the filtration member has a shape of a cylinder with a base;

a wall component disposed in a fuel passage, the fuel passage extends from the filtration member to the intake port so as to define a shape of the fuel passage, the wall component surrounds the intake port, wherein the wall component has an upper end positioned higher than the intake port, and the fuel passage is defined so that the fuel flowing through the fuel passage flows over the upper end of the wall component, the wall component is arranged inside the filtration member, the wall component is coaxially aligned with the filtration member; and a support component that supports the filtration member, the support component includes
- a pipe wall part coaxially arranged with the filtration member and the wall component,
- a bottom wall part arranged at an axial end of the pipe wall part, the bottom wall part is formed to spread in a transverse direction,
- a flange part projected from an upper end of the pipe wall part outward in a radial direction, an upper end of the filtration member is connected to the flange part, and
- a locking part for attachment to the fuel pump, wherein the wall component is formed so that a distance between the upper end of the wall component and a topmost part of the fuel passage in an up-and-down direction is smaller than a distance between the intake port and the upper end of the wall component in the up-and-down direction, the bottom wall part of the support component is arranged inside the wall component, and the fuel passage is defined between the bottom wall part and the wall component downstream of the upper end of the wall component in a fuel flowing direction.

7. The suction filter according to claim 6, wherein the bottom wall part has a hole passing through the bottom wall part, and the intake port is defined by a lower end of the hole.

* * * * *